United States Patent [19]

Morlotti

[11] Patent Number: 5,332,907
[45] Date of Patent: Jul. 26, 1994

[54] METHOD FOR RECORDING AND REPRODUCING A RADIATION IMAGE, APPARATUS USING SAID METHOD, PHOTOSTIMULABLE PHOSPHOR PANEL FOR STORING SAID RADIATION IMAGE

[75] Inventor: Romano Morlotti, Varazze, Italy

[73] Assignee: Minnesota Mining and Manufacturing Company, St. Paul, Minn.

[21] Appl. No.: 86,089

[22] Filed: Jul. 6, 1993

[30] Foreign Application Priority Data

Jul. 28, 1992 [IT] Italy ............................ MI92A001829

[51] Int. Cl.$^5$ ...................... G01N 23/04; C09K 11/85
[52] U.S. Cl. ........................... 250/484.4; 252/301.4 H
[58] Field of Search .................... 250/484.1, 581; 252/301.4 H

[56] References Cited

U.S. PATENT DOCUMENTS

| | | |
|---|---|---|
| 3,859,527 | 1/1975 | Luckey . |
| 4,239,968 | 12/1980 | Kotera et al. . |
| 4,258,264 | 3/1981 | Kotera et al. . |
| 5,089,170 | 2/1992 | Umemoto et al. ............ 252/301.4 H |

FOREIGN PATENT DOCUMENTS

| | | |
|---|---|---|
| 0083085B1 | 12/1982 | European Pat. Off. . |
| 146973A2 | 7/1985 | European Pat. Off. . |
| 0146974A2 | 7/1985 | European Pat. Off. . |
| 0148507A2 | 7/1985 | European Pat. Off. . |
| 1440726 | 6/1976 | United Kingdom ........ 252/301.4 H |

*Primary Examiner*—Paul M. Dzierzynski
*Assistant Examiner*—Richard Hanig
*Attorney, Agent, or Firm*—Gary L. Griswold; Walter N. Kirn; Mark A. Litman

[57] ABSTRACT

A method for recording and reproducing a radiation image comprising the steps of (i) causing a phosphor, which can be stimulated with visible or infrared radiations, to absorb a high energy radiation passing through an object, (ii) stimulating phosphor with visible or infrared radiations to release the energy stored as fluorescent light, and (iii) detecting fluorescent light with light detecting means, wherein the photostimulable phosphor is selected from the group consisting of green-emitting trivalent erbium activated barium ytterbium halides, trivalent erbium activated barium fluorohalides and solid solutions thereof, optionally comprising an alkali metal halide. Apparatus for recording and reproducing a radiation image using the above described method. Radiation image storage panel containing the above described photostimulable phosphors. Light-stimulable phosphors selected within the group consisting of green-emitting trivalent erbium activated barium ytterbium halides, trivalent erbium activated barium fluorohalides and solid solutions thereof, optionally comprising an alkali metal halide.

21 Claims, No Drawings

METHOD FOR RECORDING AND REPRODUCING A RADIATION IMAGE, APPARATUS USING SAID METHOD, PHOTOSTIMULABLE PHOSPHOR PANEL FOR STORING SAID RADIATION IMAGE

FIELD OF THE INVENTION

This invention relates to a method for recording and reproducing a radiation image by causing a visible or infrared radiation-stimulable phosphor to absorb a high energy radiation after it has passed through an object, stimulating said phosphor to release the energy stored as fluorescent light, and detecting said fluorescent light, the photostimulable phosphor being selected in the group consisting of green-emitting trivalent erbium activated barium ytterbium halides, trivalent erbium activated barium fluorohalides and solid solutions thereof. An alkali metal halide may optionally be present.

BACKGROUND OF THE INVENTION

U.S. Pat. No. 3,859,527 discloses a method for recording and reproducing a high energy radiation image using a radiation image storage panel comprising a stimulable phosphor which emits light when stimulated with visible or infrared light after exposure to that radiation (high energy radiation meaning an electromagnetic wave or a corpuscular radiation such as x-ray, $\alpha$-rays, $\beta$-rays, $\gamma$-rays, neutron rays, ultraviolet rays, or the like).

U.S. Pat. No. 4,258,264 discloses a method and an apparatus for reproducing a radiation image by stimulating a storage phosphor with stimulating rays, whose wavelengths are in the range of 600 to 700 nm, and detecting the stimulated light by means of a photodetector, the detected light being in the range of 300 to 500 nm.

U.S. Pat. No. 4,239,968 discloses a method and an apparatus for recording and reproducing a radiation image by utilizing the photostimulability of a blue-emitting alkaline earth metal fluorohalide phosphor activated with rare earth elements. The claimed phosphors are stimulated with a radiation having a wavelength of from 500 to 700 nm and emit light in the blue portion of the spectrum (at wavelength lower than 450 nm). The alkaline earth metal mainly consists of barium, optionally mixed with other alkaline earth metals or divalent metals selected in the group consisting of Ba, Mg, Ca, Sr, Zn, and Cd. The rare earth activators are selected in the group consisting of Eu, Tb, Ce, Tm, Dy, Pr, Ho, Nd, Yb and Er (erbium). The only phosphors exemplified relate to barium fluorohalides activated with europium, cerium and terbium. There are no suggestions that barium fluorohalides activated with erbium can emit in the green portion of the spectrum. On the contrary FIGS. 3 and 4 disclose that the claimed phosphors emit a light in the blue portion of the spectrum, and, when stimulated with a radiation having a wavelength higher than 700 nm they do not show substantial emission.

Other patents disclose a method for reproducing a radiation image by using particular classes of barium fluorohalide phosphors. For example U.S. Pat. No. 3,951,848 discloses BaFCl:Eu phosphors containing a brightness-improving additive selected among thallium, lead and aluminum; U.S. Pat. No. 4,336,154 discloses a photostimulable boron-containing phosphor having the formula $$(Ba_{1-x}M_x)F_2 \cdot aBaX_2 : yEu, zB$$

wherein M and X are the same as in the aforesaid U.S. Pat. No. 4,239,968, except that M can also be Be, and a, x, y, and z respectively satisfy the conditions $0.5 \leq a \leq 1.25$, $0 \leq x \leq 1$, $10^{-6} \leq y \leq 0.2$, and $0 \leq z \leq 0.2$.

U.S. Pat. No. 4,608,190 discloses a photostimulable potassium-containing anion deficient BaFCl:Eu/BaFBr:Eu phosphor.

EP patent application 83,085 discloses the preparation of radiation image storage panels containing a divalent europium activated complex halide represented by formula BaFX.xNaX': aEu$^{2+}$, wherein X and X' each designate at least one of Cl, Br and I, $0 \leq x \leq 0.1$ and $0 \leq a \leq 0.2$. Other patents or patent applications disclosure improvements of this patent such as, for example, EP patent application 146,974 which discloses a similar photostimulable phosphor further comprising an alkali metal selected from K, Rb and Cs, EP patent application 146,973 which disclosed a similar photostimulable phosphor further comprising scandium, EP patent application 148,507 disclosed a similar photostimulable phosphor in which part of Ba can be substituted which Ca and/or Sr, JP Patent Publication 60-90286 (1985), in which part of bromide is substituted by iodide, and the like.

All these phosphors exhibit a stimulable emission in the wavelength region of the visible spectrum shorter than 500 nm and they are preferably stimulated with light having a wavelength higher than 500 nm (such as an Ar$^+$ ion laser beam of 514.5 nm or a He-Ne laser beam of 633 nm), where they exhibit the maximum stimulability.

On the other hand, the same phosphors do not exhibit a sufficient stimulable emission when they are stimulated with light of a wavelength longer than 700 nm.

SUMMARY OF THE INVENTION

The present invention relates to new phosphors for use in panels, apparatus and methods for recording and reproducing a high energy radiation image, including the steps of stimulating a phosphor imagewise exposed to radiation and detecting the fluorescent light emitted by said phosphor upon stimulation, said phosphor being selected in the group consisting of green-emitting trivalent erbium activated barium ytterbium halides, trivalent erbium activated barium fluorohalides and solid solutions thereof, optionally comprising an alkali metal halide.

DETAILED DESCRIPTION OF THE INVENTION

The present invention relates to a method for recording and reproducing a radiation image comprising the steps of (i) causing a visible or infrared radiation-stimulable phosphor to absorb high energy radiation passing through an object, (ii) stimulating said phosphor with visible or infrared radiation to release the energy stored as fluorescent light and (iii) detecting said fluorescent light with light detecting means, said method being characterized in that said phosphor is selected in the group consisting of green-emitting trivalent erbium activated barium ytterbium halides, trivalent erbium activated barium fluorohalides and solid solutions thereof, and optionally an alkali metal halide may be added.

Preferably, the present invention relates to a method as described above wherein said phosphor is represented by the following general formula:

$$(1-y)BaFX \cdot yBaYb_n X^I_m X^{II}_o \cdot aMX^{III} : zEr \qquad (I)$$

wherein X is Cl, Br, or I, $X^I$ and $X^{II}$, the same or different, are F, Cl, Br or I, $X^{III}$ is Cl or F, M is an element selected from the group of Li,Na,K,Rb and Cs; n is 1 or 2 and m+o is 5 or 8, $0 \leq y \leq 1$, $0 \leq z \leq 0.2$, $0 \leq a \leq 0.5$.

More preferably, the present invention relates to a method as described above wherein said phosphor is represented by the following general formula:

$$(1-y)BaFX \cdot yBaYb X^I_m X^{II}_o \cdot aMX^{III} : zEr \qquad (II)$$

wherein X is Cl, Br, or I, $X^I$ and $X^{II}$, the same or different, are F, Cl, Br or I, $X^{III}$ is Cl or F, M is an element selected from the group of Li,Na,K,Rb and Cs; m+o is 5, $0 \leq y \leq 1$, $0 \leq z \leq 0.2$, $0 \leq a \leq 0.5$.

In particular, the present invention relates to the method described above wherein the wavelength of said stimulating radiation is in the range of 500 to 1100 nm.

More in particular, the present invention relates to the method described above wherein the wavelength of said stimulating radiation is in the range of 700 to 1000 nm.

The method described above is further characterized in that said fluorescent light emitted by the above mentioned phosphor has a wavelength higher than 500 nm, preferably in the range of from 500 to 600 nm.

In another aspect, the present invention relates to an apparatus for recording and reproducing a radiation image comprising (i) means for causing a visible or infrared radiation-stimulable phosphor to absorb high energy radiation after passing through an object, (ii) means for stimulating said phosphor with visible or infrared stimulating radiation to release the energy stored as fluorescent light and (iii) means for detecting said fluorescent light, said apparatus being characterized in that said phosphor is selected in the group consisting of green-emitting trivalent erbium activated barium ytterbium halides, trivalent erbium activated barium fluorohalides and solid solutions thereof, optionally comprising an alkali metal halide.

In a further aspect, the present invention relates to a high energy radiation image storage panel having a fluorescent layer comprising a binder and a stimulable phosphor dispersed in said binder, wherein said stimulable phosphor selected in the group consisting of green-emitting trivalent erbium activated barium ytterbium halides, trivalent erbium activated barium fluorohalides and solid solutions thereof, optionally comprising of an alkali metal halide.

In a still further aspect, the present invention relates to a photostimulable phosphor selected in the group consisting of green-emitting trivalent erbium activated barium ytterbium halides, trivalent erbium activated barium fluorohalides and solid solutions thereof, optionally comprising of an alkali metal halide.

The method and the apparatus for recording and reproducing a high energy radiation image using the radiation image storage panel of the present invention schematically comprise: a high energy radiation source, an object, a radiation image storage panel, a light source emitting stimulating radiations which stimulate the fluorescent layer of the panel to release the radiation energy stored therein as fluorescent light, a filter for cutting off the radiation emitted by the light source and reflected by the panel at a selected wavelength and for transmitting only the fluorescent light emitted by the panel, and a focusing optic for collecting the light emitted by the panel and passed through the filter. The combination of a photosensor with a photomultiplier is used to detect and convert the light emitted by the panel into electrical signals, the electrical signal being amplified by means of an amplifier and said amplified electrical signal being analyzed by a data analyzer.

Means for causing a visible or infrared radiation-stimulable phosphor to absorb high energy radiation passing through an object are known in the art, as described in U.S. Pat. No. 4,239,968. They include a high energy radiation source (such as e.g. an X-ray tube) and a radiation image storage panel similar to that of the present invention including a phosphor different from those of the present invention. When the phosphor is exposed to X-rays, the radiation passes through the object. The intensity of the radiation which has passed through the object represents the transmittance factor of the object. Furthermore, an image which represents the transmittance pattern of the object is obtained by means of the radiation impinging upon the panel. The radiation is absorbed by the fluorescent layer of the panel and electrons or holes are generated in the fluorescent layer in proportion to the amount of the absorbed radiation. The electrons or holes are stored in the traps of the phosphors of the present invention. The radiation image stored in the panel is converted to visible radiation upon stimulation with a stimulating radiation beam. Means for stimulating said panel with visible or infrared radiations are known in the art to include stimulating radiation sources emitting in the infrared or visible field, such as for example, respectively, a 0.06 mW QJ Lamp emitting at 800 nm or a He-Ne laser emitting a laser beam at 633 nm, as described in U.S. Pat. No. 4,239,968. A scanner apparatus allows the fluorescent layer of the panel to be scanned with stimulating radiations emitted by a light source, as described in U.S. Pat. No. 4,258,264. Focusing means allow said stimulating light to be focused on the panel in a small spot (such as 0.7 mm$^2$), as described in U.S. Pat. No. 4,258,264. The electrons or holes stored in the traps of the photostimulable phosphors are expelled therefrom, and the radiation image stored in the panel is released as fluorescent light.

The luminescence of the fluorescent light emitted by the panel is proportional to the number of the electrons or holes stored in the fluorescent layer of the panel, that is to the amount of the radiation absorbed therein.

Means for detecting said fluorescent light emitted by the panel are known in the art to include: (a) interference filter means, whose transmission peak is tuned to the wavelength of the signal emitted by the sample to filter-out the unwanted stimulating light (such as e.g. a BG1 or BG3 Schott filter); (b) optical means to collect the light emitted by the panel such as for example light guide members having a linear or arcuate end portion to be located adjacent to a scan line of the photostimulable phosphor to receive and guide the light emitted by the phosphor and an anular end portion to be located adjacent to the light receiving face of the photodetector, such as described in U.S. Pat. No. 4,346,295. Useful optical means to collect the light emitted by the panel are also represented by elliptical mirrors having the concave side turned towards the panel and on opening for the passage of said stimulating radiation, as described in European Patent Application S.N. 210,505; (c) the combination of a photosensor with a photomultiplier to detect and convert the fluorescent light into electrical signals (such as e.g. a Thorn Emi 9635 QB photomultiplier); (d) a picoammeter for the amplification of the signal (such as e.g. and EG & G Parc Model 181 amplifier) and (e) evaluation means to evaluate the obtained electrical signal (corresponding to the original high energy radiation image), such as e.g. a data analyzer.

The radiation image storage panel of the above described apparatus has a fluorescent layer comprising, as a stimulable phosphor, at least one phosphor selected in the group consisting of green-emitting trivalent erbium activated barium ytterbium halides, trivalent erbium activated barium fluorohalides and solid solutions thereof, optionally comprising an alkali metal halide.

BaFX (X=Cl or Br) is a typical host for $Eu^{2+}$, which gives a bell-shaped blue-UV emission band with a maximum depending upon the nature of X. On the contrary the barium fluorohalide, the barium ytterbiumhalide and the solid solutions thereof activated with erbium, optionally containing an alkali metal halide show a green emission with a maximum between 500 and 600 nm.

The storage capability of the BaFX phosphors is believed to be due to the hole trapping at $Eu^{2+}$ sites and to electron trapping at $F^+$ centers with respective formation of $Eu^{3+}$ and F centers. Photostimulation with visible or infrared light is believed to release electrons from F-centers ($F \rightarrow F^+ + e^-$) promoting their recombination with holes at $Eu^{3+}$ with consequent emission of light ($Eu^{3+} + e^- \rightarrow Eu^{2+} + h\nu$).

In agreement with this model, the efficiency of storage capability is enhanced by increasing the concentration of $F^+$ centers (and of course of $Eu^{2+}$ ions, in a certain range).

The storage capability of the phosphors of the present invention, as a preliminary hypothesis, is believed to be due to the hole trapping at $Yb^{2+}$ (as Yb at least at low concentration can be reasonable supposed in the divalent state, due to its low reduction potential) and to the electron trapping at anion vacancy centers. However increasing Yb concentration, the probability that it takes the 3+ valence state increases as well. In this condition, $Yb^{3+}$ could compete with anion vacancies for electron trapping. The optical stimulability reaches a maximum versus Yb concentration, in agreement with this preliminary theory.

In particular, the radiation image storage panel of the apparatus above has a fluorescent layer comprising, as a stimulable phosphor, at least one phosphor represented by the formula:

$$(1-y)BaFX \cdot yBaYb_nX^I_mX^{II}_o \cdot aMX^{III}:zEr \qquad (I)$$

wherein X is Cl, Br, or I, $X^I$ and $X^{II}$, the same or different, are F, Cl, Br or I, $X^{III}$ is Cl of F, M is an element selected from the group of Li, Na, K, Rb and Cs; n is 1 or 2 and m+o is 5 or 8, $0 \leq y \leq 1$, $0 \leq z \leq 0.2$, $0 \leq a \leq 0.5$.

More preferably, said panel comprises at least one phosphor represented by the following general formula:

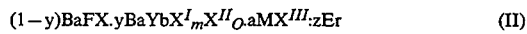

$$(1-y)BaFX \cdot yBaYbX^I_mX^{II}_o \cdot aMX^{III}:zEr \qquad (II)$$

wherein X is Cl, Br, or I, $X^I$ and $X^{II}$, the same or different, are F, Cl, Br, or I, $X^{III}$ is Cl or F, M is an element selected from the group of Li, Na, K, Rb and Cs; m+o is 5, $0 \leq y \leq 1$, $0 \leq z \leq 0.2$, $0 \leq a \leq 0.5$.

The phosphor of the present invention, as defined in the general formulas (I) and (II) described above, is characterized in that the fluorescent light emitted upon stimulation by electromagnetic radiation has a wavelength higher than 500 nm, preferably in the range of from 500 to 600 nm.

Furthermore, it has been found that the luminescence of the fluorescent light emitted by the stimulable phosphors of the present invention tends to be higher than that of any other known storage europium activated barium fluorohalide phosphor, when stimulated by electromagnetic radiation having wavelength in the range from 500 to 1100 nm, preferably of from 700 to 1100.

In fact, while the photostimulable europium activated barium fluorohalide phosphors known in the art do not exhibit a significant emission when stimulated by an infrared stimulating radiation, the light emitted by the phosphors of the present invention exhibits a significant fluorescence even when the phosphor is stimulated with radiations in the infrared region of the electromagnetic spectrum.

The above mentioned phosphors of the present invention are thermally processed.

Such thermal processing includes heating which can be performed in the presence of a salt acting as a "flux" (such as ammonium chloride, sodium carbonate, and the like), at a temperature in the range of 600° to 1000° C., preferably 700° to 900° C., and cooling at room temperature before the obtained phosphors are repeatedly washed with water to be purified. Heating can be performed with a mechanical mixture of the reagents in a crucible in the air or inert gas atmosphere, e.g. argon, for a time ranging from 1 to 10, preferably from 1 to 5 hours.

The radiation image storage panels of the present invention normally comprise a fluorescent layer including a binder and, dispersed therein, at least one phosphor of the present invention. The fluorescent layer is formed by dispersing the phosphor in the binder to prepare a coating dispersion, and then applying the coating dispersion according to conventional coating methods to form a uniform layer. Although the fluorescent layer itself can be a radiation image storage panel when the fluorescent layer is self-supporting, the fluorescent layer is generally provided on a substrate to form a radiation image storage panel. Further, a protective layer is usually provided on the surface of the fluorescent layer for physically and chemically protecting the fluorescent layer. Furthermore, a primer layer is sometimes provided between the fluorescent layer and the substrate for closely binding the fluorescent layer to the substrate.

As the binder employed in the fluorescent layer of the radiation image storage panel of the present invention, there can be used for example those binders commonly used for forming layers, such as gum arabic, proteins such as gelatin, polysaccharides such as dextrane, organic polymer binders such as polyvinylbutyral, polyvinylacetate, nitrocellulose, ethylcellulose, ethylcellulose, vinylidene-chloride-vinylchloride copolymers, polymethyl-methacrylate, polybutylmethacrylate, vinylchloride-vinylacetate copolymers, polyurethane, cellulose acetate-butyr-ate, polyvinyl alcohol, and the like.

Generally, the binder is used in an amount of 0.01 to 1 part by weight per one part by weight of the phosphor. However, from the viewpoint of sensitivity and sharpness of the panel obtained, the amount of the binder should preferably be small. Accordingly, in consideration of both the sensitivity and sharpness of the panel and the easiness of application of the coating dispersion, the binder is preferably used in an amount of 0.03 to 0.2 parts by weight per one part by weight of the stimulable phosphor. The thickness of the fluorescent layer is generally within the range of 10 µm to 1 mm.

In the radiation image storage panel of the present invention, the fluorescent layer is generally coated on a substrate. As the substrate, various materials such as polymer material, glass, wool, cotton, paper, metal, or the like can be used. From the viewpoint of handling the panel as an information recording medium, the substrate should preferably be processed into a sheet or flexible roll. In this connection, as the substrate is preferable an organic polymeric film such as a cellulose acetate film, polyester film, polyethylene-terephthalate film, polyamide film, triacetate film, polycarbonate film, or the like, or ordinary paper, or processed paper such as a photographic paper, baryta paper, resincoated paper, paper which contains a pigment such as titanium dioxide, or the like. The substrate may have a primer layer on one surface thereof (the surface on which the fluorescent layer is provided) for the purpose of holding the fluorescent layer tightly. As the material of the primer layer, an ordinary adhesive can be used. In providing a fluorescent layer on the substrate or on the primer layer, a coating dispersion comprising the phosphor dispersed in a binder may be directly applied to the substrate or to the primer layer to form the fluorescent layer. Alternatively, a fluorescent layer formed be-fore-hand may be bound to the substrate or to the primer. Where the substrate used is permeable to the stimulating radiations of the phosphor, the radiation image storage panel can be exposed to the stimulating radiation from the substrate side.

Further, in the radiation image storage panel of the present invention, a protective layer for physically and chemically protecting the fluorescent layer is generally provided on the surface of the fluorescent layer intended for exposure (on the side opposite the substrate). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, a conventional material for a protective layer such as nitrocellulose, ethylcellulose, cellulose acetate, polyester, polyethyleneterephthalate, and the like can be used. The radiation image storage panel of the present invention may be colored with a colorant. Further, the fluorescent layer on the radiation image storage panel of the present invention may contain a white powder dispersed therein. By using a colorant or a white powder, a radiation image storage panel which provides a very sharp image can be obtained.

The present invention will be described with more details referring to the following examples.

Approximations in expressions of the numerical values which indicate the molar fractions are the cause of approximation in the numerical value expressing the sum thereof (in some cases 0.9999,- in other cases 0.9998-, rather than 1.0000).

EXAMPLE 1

Preparation of the phosphor shown as compound 11 in the following table 1 $0.997BaFCl.0.003Er^{3+}$ A mixture consisting of 4.571 g of $BaF_2$, 5.429 g of $BaCl_2$, and 0.04036 g of $ErCl_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compound 1 of Table 1 was prepared in the same way by using the appropriate amount of ingredients.

EXAMPLE 2

Preparation of the phosphor shown as compound 12 in the following table 1
$0.9854BaFCl.0.0115BaYbFCl_4 : 0.003Er^{3+}$ A mixture consisting of 4.478 g of $BaF_2$, 5.318 of $BaCl_2$, 0.1645 g of $YbCl_3$ and 0.0397 g of $ErCl_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compounds 2 to 9, 13, 14, and 16 of Table 1 were prepared in the same way by using the appropriate amount of ingredients.

EXAMPLE 3

Preparation of the phosphor shown as compound 10 in the following table 1 $0.9997BaYbFCl_4 : 0.0003Er^{3+}$ A mixture consisting of 1.8607 g of $BaF_2$, 5.9273 g of $YbCl_3$ and 0.0016 g of $ErCl_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compounds 15 and 17 of Table 1 were prepared in the same way by using the appropriate amount of ingredients.

EXAMPLE 4

Preparation of the phosphor shown as compound 25 in the following table 1
$0.9639BaFCl.0.0331NaCl : 0.003Er^{3+}$ A mixture consisting of 4.505 g of $BaF_2$, 5.351 g of $BaCl_2$, 0.1027 g of NaCl and 0.0413 g of $ErCl_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compound 18 of Table 1 was prepared in the same way by using the appropriate amount of ingredients.

EXAMPLE 5

Preparation of the phosphor shown as compound 26 in the following table 1
$0.9522BaFCl.0.01114BaYbFCl_4.0.0337NaCl : 0.003Er^{3+}$ A mixture consisting of 7.4310 g of $BaF_2$, 5.2626 g of $BaCl_2$, 0.1033 g of NaCl, 0.1626 g of $YbCl_3$ and 0.0406 g of $ErCl_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compounds 19 to 24, 27, and 29 of Table 1 were prepared in the same way by using the appropriate amount of ingredients.

EXAMPLE 6

Preparation of the phosphor shown as compound 28 in the following table 1
0.9159BaYbFCl$_4$.0.0812NaCl:0.003Er$^{3+}$ A mixture consisting of 1.837 g of BaF$_2$, 2.181 g of BaCl$_2$, 0.1085 g of NaCl, 5.855 g of YbCl$_3$ and 0.0177 g of ErCl$_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

TABLE 1

| Phosphor Sample | Formula |
|---|---|
| 1  | 0.99997 BaFCl.0.00003 Er$^{3+}$ |
| 2  | 0.9988 BaFCl.0.0012 BaYbFCl$_4$:0.00003 Er$^{3+}$ |
| 3  | 0.9884 BaFCl.0.0116 BaYbFCl$_4$:0.00003 Er$^{3+}$ |
| 4  | 0.942 BaFCl.0.0058 BaYbFCl$_4$:0.00003 Er$^{3+}$ |
| 5  | 0.884 BaFCl.0.116 BaYbFCl$_4$:0.00003 Er$^{3+}$ |
| 6  | 0.9985 BaFCl.0.0012 BaYbFCl$_4$:0.0003 Er$^{3+}$ |
| 7  | 0.9881 BaFCl.0.011 BaYbFCl$_4$:0.0003 Er$^{3+}$ |
| 8  | 0.9417 BaFCl.0.0579 BaYbFCl$_4$:0.0003 Er$^{3+}$ |
| 9  | 0.8837 BaFCl.0.1159 BaYbFCl$_4$:0.0003 Er$^{3+}$ |
| 10 | 0.9997 BaYbFCl$_4$:0.0003 Er$^{3+}$ |
| 11 | 0.997 BaFCl$_4$:0.0003 Er$^{3+}$ |
| 12 | 0.9854 BaFCl.0.011 BaYbFCl$_4$:0.0003 Er$^{3+}$ |
| 13 | 0.9392 BaFCl.0.0578 BaYbFCl$_4$:0.0003 Er$^{3+}$ |
| 14 | 0.8810 BaFCl.0.1156 BaYbFCl$_4$:0.0003 Er$^{3+}$ |
| 15 | 0.997 BaYbFCl$_4$:0.003 Er$^{3+}$ |
| 16 | 0.8575 BaFCl.0.1185 BaYbFCl$_4$:0.0003 Er$^{3+}$ |
| 17 | 0.97 BaYbFCl:0.03 Er$^{3+}$ |
| 18 | 0.9679 BaFCl.0.0321 NaCl:0.00003 Er$^{3+}$ |
| 19 | 0.9551 BaFCl.0.0112 BaYbFCl$_4$.0.0337 NaCl:0.00003 Er$^{3+}$ |
| 20 | 0.8497 BaFCl.0.111 BaYbFCl$_4$.0.0387 NaCl:0.00003 Er$^{3+}$ |
| 21 | 0.9653 BaFCl.0.0012 BaYbFCl$_4$.0.0332 NaCl:0.0003 Er$^{3+}$ |
| 22 | 0.9548 BaFCl.0.0112 BaYbFCl$_4$.0.0337 NaCl:0.0003 Er$^{3+}$ |
| 23 | 0.9078 BaFCl.0.0558 BaYbFCl$_4$.0.0359 NaCl:0.0003 Er$^{3+}$ |
| 24 | 0.8494 BaFCl.0.1114 BaYbFCl$_4$.0.0387 NaCl:0.0003 Er$^{3+}$ |
| 25 | 0.9639 BaFCl.0.0331 NaCl:0.003 Er$^{3+}$ |
| 26 | 0.9622 BaFCl.0.01114 BaYbFCl$_4$.0.0337 NaCl:0.003 Er$^{3+}$ |
| 27 | 0.8469 BaFCl.0.11114 BaYbFCl$_4$.0.0387 NaCl:0.003 Er$^{3+}$ |
| 28 | 0.9159 BaYbFCl.0.0838 NaCl$_4$:0.003 Er$^{3+}$ |
| 29 | 0.825 BaFCl.0.1082 BaYbFCl$_4$.0.0385 NaCl:0.03 Er$^{3+}$ |

EXAMPLE 7

Samples of phosphors of Table 1 were exposed to 40 KVp and 30 mA X-ray radiation for 5 seconds. After 2 minutes they were then stimulated with a 633 nm light beam, which was obtained by causing the light to be emitted by a 0.7 mV He-Ne laser and passed through a Melles-Griot type FIL026 filter. The light power was 0.017 μW/cm$^2$ as measured by a EG&G Parc Model 450 radiometer. Stimulation was performed for 60 seconds, with shot of 1 second, by using a Programmable Shutter Supply (Ealong). Photostimulated light emitted by the phosphor was collected by a green-sensitive photomultiplier (Emi Thorn 9635 QB type) and converted into electrical signals. Light collection was performed by using an interference optical filter (Schott TVM1.5 type) collecting light in the blue-green range of wavelength, provided with two gray filters, i.e., Melles-Griot FIL007 (D=0.3) and FIL015 (D=0.5).

The electrical signal was amplified by the combination of an EG&G Parc Model 181 pre-amplifier and an EG&G Parc Model 113 amplifier. The signal was then evaluated by a Data Precision 6000, Division Analogic Corp., data analyser.

EXAMPLE 8

Samples of phosphors of table 1 were exposed to X-ray radiations as described in Example 7, with the only difference that the phosphors were stimulated with a 800 nm light beam obtained by causing such light to be emitted by a QJ Lamp (Osram, HLX-64625-FCR) and passed through Melles-Griot type FIL007 plus FIL015 and Schott RG850 filters. The light power was 0.2 μW/cm$^2$ measured as above.

EXAMPLE 9

The following Table 2 reports the photostimulated emitted light emission values of the phosphors of table 1, processed as described in Examples 7 and 8. In comparison a sample of BaFCl:0.0001Eu$^{2+}$ phosphor (Sample 30) described in the art was evaluated under the same conditions with the exception that an interference optical filter (Schott BG3) collecting light in the UV-blue range of wavelength was used and that the data read by the photomultiplier were corrected for different sensitivity.

In Table 2, the emission efficiency value of the reference phosphor (compound 5) has been normalized to 100 in both the cases of 633 and 800 nm stimulation. This does not mean that the emission efficiency value of such phosphor when stimulated at 633 nm is equal to the emission efficiency value of the same phosphor when stimulated at 800 nm.

The emission efficiency values of comparison sample 30 do not mean that this sample has a superior result, because the emission light is measured at different wavelength. These values means that the phosphors of the present invention show a blue-green emission comparable to the UV-blue emission of the comparison sample 30, which does not show a significant emission at wavelength higher than 400 nm.

TABLE 2

| Sample | Emission efficiency | |
|---|---|---|
|  | 633 | 800 |
| 1  | 125 | 135 |
| 2  | 127 | 138 |
| 3  | 140 | 150 |
| 4  | 155 | 175 |
| 5  | 100 | 100 |
| 6  | 77  | 84  |
| 7  | 100 | 100 |
| 8  | 125 | 125 |
| 9  | 80  | 60  |
| 10 | 4   | 0.6 |
| 11 | 15  | 25  |
| 12 | 48  | 44  |
| 13 | 80  | 75  |
| 14 | 21  | 16  |
| 15 | 6   | 0.8 |
| 16 | 41  | 25  |
| 17 | 0.1 | 0.4 |
| 18 | 220 | 450 |
| 19 | 230 | 530 |
| 20 | 200 | 500 |
| 21 | 136 | 390 |
| 22 | 197 | 460 |
| 23 | 225 | 540 |
| 24 | 190 | 450 |
| 25 | 76  | 263 |
| 26 | 140 | 310 |
| 27 | 103 | 172 |
| 28 | 30  | 5   |
| 29 | 130 | 200 |

TABLE 2-continued

| Sample | Emission efficiency 633 | 800 |
|---|---|---|
| 30 | 52 | 156 |

EXAMPLE 10

Preparation of the phosphor shown as compound 33 in the following table 3 $0.97BaYbF_5:0.03Er^{3+}$ A mixture consisting of 4.2526 g of $BaF_2$, 5.5793 g of $YbF_3$ and 0.1682 g of $ErF_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compounds 31 and 32 of Table 3 were prepared in the same way by using the appropriate amount of ingredients.

EXAMPLE 11

Preparation of the phosphor shown as compound 36 in the following table 3 $0.8771BaYbF_5.0.0958NaF:0.027Er^{3+}$ A mixture consisting of 4.2482 g of $BaF_2$, 0.0111 g of NaF, 5.5734 g of $YbF_3$ and 0.1673 g of $ErF_3$ was put in a silica reaction vessel and then heated at a temperature of 800° C. for 2 hours in inert atmosphere. The obtained phosphor was then left to cool in the air to room temperature, pulverized, sieved in cold water and dried at 150° C.

Compounds 34 and 35 of Table 3 were prepared in the same way by using the appropriate amount of ingredients.

TABLE 3

| Phosphor Sample | Formula |
|---|---|
| 31 | 0.9997 $BaYbF_5:0.0003$ $Er^{3+}$ |
| 32 | 0.997 $BaYbF_5:0.0003$ $Er^{3+}$ |
| 33 | 0.97 $BaYbF_5:0.0003$ $Er^{3+}$ |
| 34 | 0.8995 $BaYbF_5.0.0975$ $NaF:0.0003$ $Er^{3+}$ |
| 35 | 0.8999 $BaYbF_5.0.0973$ $NaF:0.0003$ $Er^{3+}$ |
| 36 | 0.8771 $BaYbF_5.0.0958$ $NaF:0.0003$ $Er^{3+}$ |

EXAMPLE 12

Samples of phosphors of table 3 were exposed to X-ray radiations as described in Examples 7 and 8.

EXAMPLE 13

The following Table 4 reports the photostimulated emitted light emission values of the phosphors of table 3, processed as described in Example 12.

TABLE 4

| Sample | Emission Efficiency 633 | 800 |
|---|---|---|
| 31 | 0.3 | 0.1 |
| 32 | 0.6 | 0.14 |
| 33 | 0.7 | 0.16 |
| 34 | 0.5 | 4 |
| 35 | 1 | 5 |
| 36 | 1.2 | 7 |

The results of emission efficiency of table 4 are comparable with the data of table 2. In particular compounds 31, 32, and 33 can be compared with compounds 10, 15, and 17 having a similar composition, and compound 35 can be compared with compound 28.

I claim:

1. A method for recording and reproducing a radiation image comprising the steps of (i) causing a visible or infrared radiation-stimulable phosphor to absorb a high energy radiation passing through an object, (ii) stimulating said phosphor with visible or infrared radiations to release the energy stored as fluorescent light, and (iii) detecting said fluorescent light with light detecting means, characterized in that said phosphor is selected from the group consisting of green-emitting trivalent erbium activated barium ytterbium halides, trivalent erbium activated barium fluorohalides and solid solutions thereof.

2. The method for recording and reproducing a radiation image of claim 1, wherein said phosphor further comprises an alkali metal halide.

3. The method for recording and reproducing a radiation image of claim 1, wherein said phosphor is represented by the following general formula:

$$(1-y)BaFX.yBaYb_nX^I_mX^{II}_O.aM^{III}X:zEr \qquad (I)$$

wherein X is Cl, Br, or I, $X^I$ and $X^{II}$, the same or different, are F, Cl, Br or I, $X^{III}$ is Cl or F, M is an element selected from the group of Li, Na, K, Rb and Cs; n is 1 or 2 and m+o is 5 or 8, $0 \leq y \leq 1$, $0 < z \leq 0.2$, $0 \leq a \leq 0.5$.

4. The method for recording and reproducing a radiation image of claim 1, wherein said phosphor is stimulated with a radiation having a wavelength in the range of 500 to 1100 nm.

5. The method for recording and reproducing a radiation image of claim 1, wherein said phosphor is stimulated with a radiation having a wavelength in the range of 700 to 1000 nm.

6. The method for recording and reproducing a radiation image of claim 1, wherein said phosphor emits a fluorescent light having a wavelength higher than 500 nm.

7. The method for recording and reproducing a radiation image of claim 1, wherein said phosphor emits a fluorescent light having a wavelength of from 500 to 600 nm.

8. An improved apparatus for recording and reproducing a radiation image comprising (1) means for causing a visible or infrared radiation-stimulable phosphor to absorb a high energy radiation passing through an object, (ii) means for stimulating said phosphor with visible or infrared radiations to release the energy stored as fluorescent light, and (iii) means for detecting said fluorescent light, said apparatus being characterized in that said phosphor is selected from the group consisting of green-emitting trivalent erbium activated barium ytterbium halides, trivalent erbium activated barium fluorohalides and solid solutions thereof.

9. The apparatus for recording and reproducing a radiation image of claim 8, wherein said phosphor further comprises an alkali metal halide.

10. The apparatus for recording and reproducing a radiation image of claim 8, wherein said phosphor is represented by the following general formula:

$$(1-y)BaFX.yBaYb_nX^I_mX^{II}_O.aM^{III}X:zEr \qquad (I)$$

wherein X is Cl, Br, or I, $X^I$ and $X^{II}$, the same or different are F, Cl, Br or I, $X^{III}$ is Cl or F, M is an element selected from the group of Li,Na,K,Rb and Cs; n is 1 or 2 and m+o is 5 or 8, $0 \leq y \leq 1$, $0 < z \leq 0.2$, $0 \leq a \leq 0.5$.

11. The apparatus for recording and reproducing a radiation image of claim 8, wherein said phosphor is stimulated with a radiation having a wavelength in the range of 500 to 1100 nm.

12. The apparatus for recording and reproducing a radiation image of claim 8, wherein said phosphor emits a fluorescent light having a wavelength higher than 500 nm.

13. The apparatus for recording and reproducing a radiation image of claim 8, wherein said phosphor emits a fluorescent light having a wavelength of from 500 to 600 nm.

14. A radiation image storage panel having a fluorescent layer comprising a binder and a stimulable phosphor dispersed therein characterized in that said phosphor is selected from the group consisting of green-emitting trivalent erbium activated barium ytterbium halides, trivalent erbium activated barium fluorohalides and solid solutions thereof.

15. The radiation image storage panel of claim 14, wherein said phosphor further comprises an alkali metal halide.

16. The radiation image storage panel of claim 14, wherein said phosphor is represented by the following general formula:

$$(1-y)BaFX \cdot yBaYb_n X^I_m X^{II}_o \cdot aM^{III}X{:}zEr \qquad (I)$$

wherein X is Cl, Br, or I, $X^I$ and $X^{II}$, the same or different, are F, Cl, Br or I, $X^{III}$ is Cl or F, M is an element selected from the group of Li,Na,K,Rb and Cs; n is 1 or 2 and m+o is 5 or 8, $0 \leq y \leq 1$, $0 < z \leq 0.2$, $0 \leq a \leq 0.5$.

17. A photostimulable phosphor selected from the group consisting of green-emitting trivalent erbium activated barium ytterbium halides, trivalent erbium activated barium fluorohalides and solid solutions thereof.

18. The photostimulable phosphor of claim 17, wherein said phosphor further comprises an alkali metal halide.

19. The photostimulable phosphor of claim 17, wherein said phosphor is represented by the following general formula:

$$(1-y)BaFX \cdot yBaYb_n X^I_m X^{II}_o \cdot aM^{III}X{:}zEr \qquad (I)$$

wherein X is Cl, Br, or I, $X^I$ and $X^{II}$, the same or different, are F, Cl, Br or I, $X^{III}$ is Cl or F, M is an element selected from the group of Li,Na,K,Rb and Cs; n is 1 or 2 and m+o is 5 or 8, $0 \leq y \leq 1$, $0 < z \leq 0.2$, $0 \leq a \leq 0.5$.

20. The photostimulable phosphor of claim 17, wherein said phosphor emits a fluorescent light having a wavelength higher than 500 nm.

21. The photostimulable phosphor of claim 17, wherein said phosphor emits a fluorescent light having a wavelength of from 500 to 600 nm.

* * * * *

UNITED STATES PATENT AND TRADEMARK OFFICE
CERTIFICATE OF CORRECTION

PATENT NO. : 5,332,907
DATED : July 26, 1994
INVENTOR(S) : Morlotti et al.

It is certified that error appears in the above-indentified patent and that said Letters Patent is hereby corrected as shown below:

Column 5, line 61, delete "of"
and insert --or--.
Column 9, Table 1, #26, change the
first six characters of the formula
from "0.9622" to --0.9522--.

Signed and Sealed this

Thirteenth Day of December, 1994

Attest:

BRUCE LEHMAN

*Attesting Officer*     *Commissioner of Patents and Trademarks*